July 17, 1928. 1,677,879
T. C. LEAKE
SELF OILING BEARING
Filed June 27, 1922
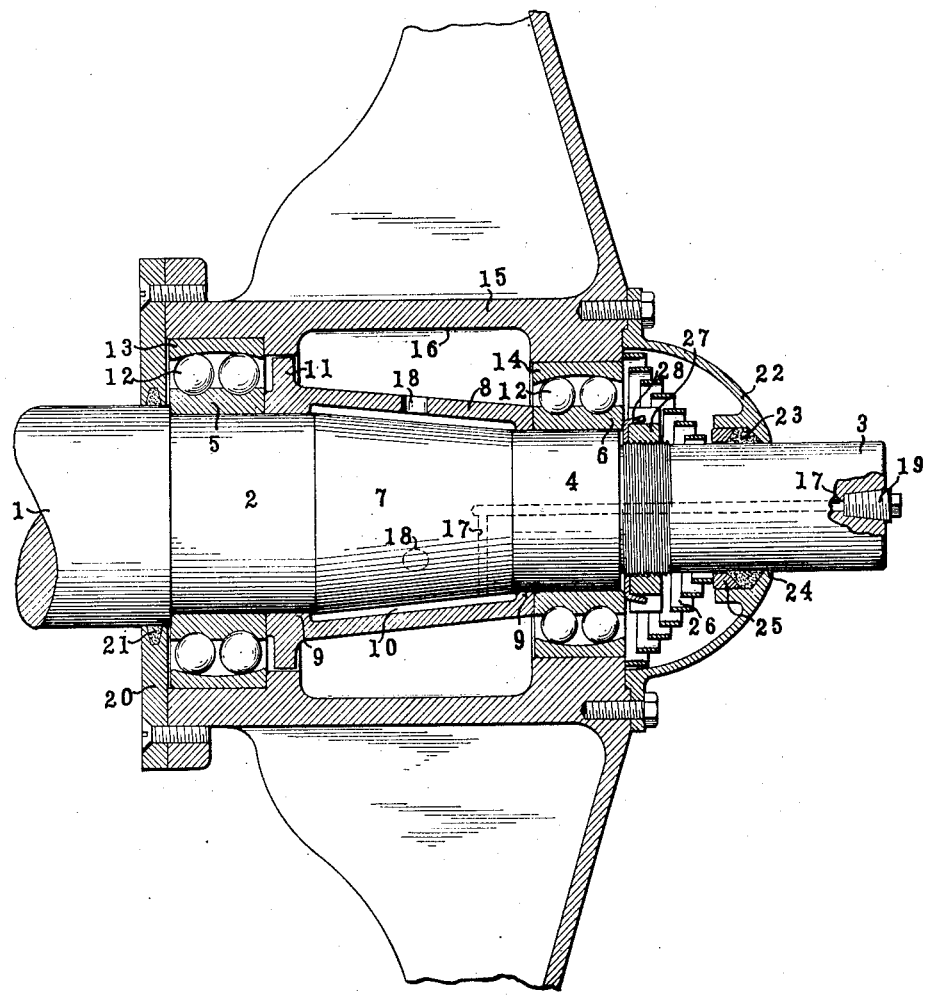
INVENTOR
Thomas C. Leake
BY
Duell, Warfield & Duell
ATTORNEY Patented July 17, 1928.

1,677,879

UNITED STATES PATENT OFFICE.

THOMAS C. LEAKE, OF NEW YORK, N. Y., ASSIGNOR TO BEAR TRACTOR CORPORATION OF AMERICA, OF NEW YORK, N. Y., A CORPORATION OF DELAWARE.

SELF-OILING BEARING.

Application filed June 27, 1922. Serial No. 571,309.

This invention relates to bearings, and more particularly in some of its details to the means for holding and distributing oil to the revolving parts which get little or no attention and are subject to hard usage. The invention is particularly adapted to oil all the bearings of vehicle wheels, idlers or sprockets in tractors, and the like.

The invention has for its general object an improved construction and arrangement of parts particularly adapted to distribute oil to the moving bearing parts in an efficient and reliable manner.

A more specific object of the invention is to provide an oiling system for journals which will effectively supply lubricant thereto without attention for long periods of time.

Other objects and advantages will be in part pointed out in connection with the following detailed description and in part obvious from the arrangement and constructions there set forth.

The invention accordingly consists in the features of construction, combinations of elements and arrangement of parts which will be exemplified in the construction hereinafter set forth, and the scope of the application of which will be indicated in the following claims.

For a more complete understanding of the nature and advantages of this invention reference should be had to the following detailed description wherein is set forth the best illustrative embodiment at present known to me, taken in connection with the accompanying drawing in which the single figure shows a fragmentary central sectional view through a bearing embodying the invention.

Referring now specifically to the embodiment shown in the drawing, an axle or shaft 1 is shown having a bearing formation at its end with a base portion 2 of comparatively large diameter tapering off towards its outer end and terminating in a supporting extension 3. The base portion 2 is cylindrical, and spaced therefrom is a cylindrical portion 4, these two cylindrical portions constituting bearing seats upon which the bearing rings 5 and 6 are pressed. A conical surface 7 of the axle is disposed intermediate the cylindrical bearing sections and a conical spacing sleeve 8 overlies said surface, being spaced therefrom to provide a surrounding chamber 10. The sleeve is provided with inwardly disposed annular bearing flanges 9 at opposite extremities thereof adapted to co-operate with the cylindrical bearing surfaces to support the sleeve in position on the axle. The openings provided by these flanges correspond approximately respectively to the cylindrical bearing surfaces 2 and 4 so the sleeve may be pressed in position on the axle, together with the bearing rings, functioning as a spacer for the latter, as shown in the drawing. An external circumferential flange 11 may be provided adjacent the larger end of the conical spacing sleeve which is employed as a support co-operating with the hub 15, hereinafter referred to, to hold the sleeve in position in alignment with the bearings when the wheel or sprocket is removed from the axle.

The bearing rings 5 and 6 are provided with external ball races accommodating bearing balls 12 which bear also in the internal ball races of the outer rings 13 and 14. These outer rings are disposed concentrically respectively with the rings 5 and 6 and are seated in position in the hub 15, as shown. This hub may form part of a rotating wheel, or the like, supported on the axle 1, or the axle may be rotatably supported in the hub. The hub is provided with an annular space 16 surrounding the sleeve 8 providing a reservoir or storage space for oil or other lubricant. The opposite extremities of this reservoir are disposed adjacent the respective ball races, and the lubricant is fed therefrom gradually to the movably engaging parts of the bearing, sufficient lubricant being stored to meet the lubrication requirement for a comparatively long space of time.

In order to replenish the supply of lubricant in the reservoir 16 provision is made for filling the same through a conduit 17 formed at the center of the axle and opening at its inner end into the chamber 10, while openings 18 in the walls of the sleeve 8 provide continuations of the filling conduit communicating with the reservoir. An enlarged opening at the end of the axle, closed by a threaded plug 19 serves for attachment of an appropriate pump or grease gun for injecting lubricant into the reservoir.

A plate 20 having a central aperture with packing 21 around the edges thereof contacting with the axle 1 serves to keep dirt from the inner or base end of the bearing and keep the lubricant from running out.

Plate 20 also functions to take up lateral thrusts on the hub abutting for this purpose at its inner face with an abutment member, not shown. A novel arrangement is also provided at the outer end of the bearing to keep the dirt out and the lubricant in. As shown, a cup-shaped shield or convex cap plate 22 is suitably secured to the hub 15, having a central opening through which the axle extension 3 passes. This shield is provided at its central opening with an annular recess for receiving packing 23, an external flange 24 confining the packing from the exterior, while an internal plunger ring 25 serves to adjust the packing from within and to hold it in position. This ring is yieldingly held in position against the packing by means of a conical coiled compression spring 26 engaging at its small end with the inner surface of the ring and at its large end with the hub 15. It will thus be seen that both ends of the spring engage parts having no relative rotative movement in use, and there is consequently little tendency of the spring to become displaced, insuring a tight joint under all conditions and avoiding friction and wear. The packing adjusting mechanism is entirely automatic in operation and is housed and protected from accidental injury and cannot be tampered with from without. The bearing rings and hub are kept in place on the axle by means of a nut 27 threaded on the axle and held in position by a lock-washer or plate 28.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

I claim:

1. In a self-lubricating bearing for vehicle wheels or the like, the combination with an axle and a hub associated for relative rotation and having spaced bearings therebetween, of a storage reservoir for lubricant disposed between said hub and axle and between said spaced bearings, an axle extension for said axle at the outer end thereof, a lubricant conduit leading to said reservoir and extending through said axle and axle extension for insertion of lubricant to the reservoir from an external point, a recessed cap secured to said hub through which the axle extension projects to an external point, packing between the cap and axle extension, a retaining nut housed within the recess of said cap and threaded on said axle and adapted to retain the bearing parts in assembled relation and a conical spring housed within the recess of said cap stressed between said hub and packing to automatically adjust the latter, said nut and spring being housed within said cap and protected thereby.

2. In a self-lubricating bearing for vehicle wheels or the like the combination with an axle and hub associated for relative rotation and having spaced bearings therebetween including bearing rings mounted on the axle and hub, of a spacing sleeve surrounding the axle and disposed between said bearing rings for holding the latter in spaced relation on the axle and having a supporting bearing with said hub so as to support said sleeve in operative position independently of the axle, a lubricant reservoir between said hub and sleeve and between said bearing rings, a retaining nut threaded to said axle and adapted to retain said bearing parts in assembled relation, a cap attached to said hub, an axle extension projecting beyond said retaining nut and through and beyond said cap, packing between said cap and axle extension, and a lubricant conduit in said axle communicating with said reservoir and leading to the exterior part of said axle extension.

3. In a bearing for vehicle wheels or the like the combination with an axle and a hub associated for relative rotation and having bearings therebetween, of a retaining nut threaded to said axle and adapted to retain said hub and axle in bearing position, a cup shaped cap attached to said hub and having a recess in which said retaining nut is housed, a supporting axle extension projecting beyond said retaining nut and through and beyond said cap, packing between said cap and axle extension and a coiled conical spring housed within said cap recess for yieldingly pressing said packing into operative position.

4. In a self-lubricating bearing for vehicle wheels or the like, the combination with an axle and a hub associated for relative rotation and having spaced bearings therebetween including bearing rings mounted on the axle and hub, of a spacing sleeve surrouding the axle and disposed between said bearing rings for supporting the latter in spaced relation upon the axle, supporting formations between said hub and sleeve for supporting the latter in axial alignment with the bearings independently of the axle, a retaining nut threaded to said axle and adapted to retain said bearing parts in assembled relation, a recessed cap attached to said hub and forming a housing for said retaining nut, an axle extension projecting beyond said retaining nut and through and beyond said cap, and packing between said cap and axle extension and housed in the recess of said cap.

5. In a self lubricating bearing for vehicle wheels or the like, the combination with an axle and a hub associated for relative rotation and having bearings therebetween, of an annular lubricant reservoir disposed between said hub and axle so lubricant may be fed therefrom to said bearings, an axle supporting extension projecting at the outer end of said axle, a lubricant conduit leading to said reservoir and extending through said axle and axle extension for insertion of lubricant to the reservoir from an external point, a cup shaped cap plate secured to the outer end of said hub and provided with an opening through which said axle supporting extension projects to an exterior point, packing between said cap and supporting extension, a securing device having connection with said axle and adapted to retain the bearing parts in assembled relation, and a conical coiled spring housed within said cap plate bearing at one end against the outer end of the hub and stressed between said hub and said packing to press the latter into tight sealing engagement between said cap and said axle supporting extension.

In testimony whereof I affix my signature.

THOMAS C. LEAKE.